(No Model.)
H. C. SPALDING.
MEANS FOR PROTECTING ELECTRICAL CONDUCTORS UNDERGROUND.
No. 327,463. Patented Sept. 29, 1885.
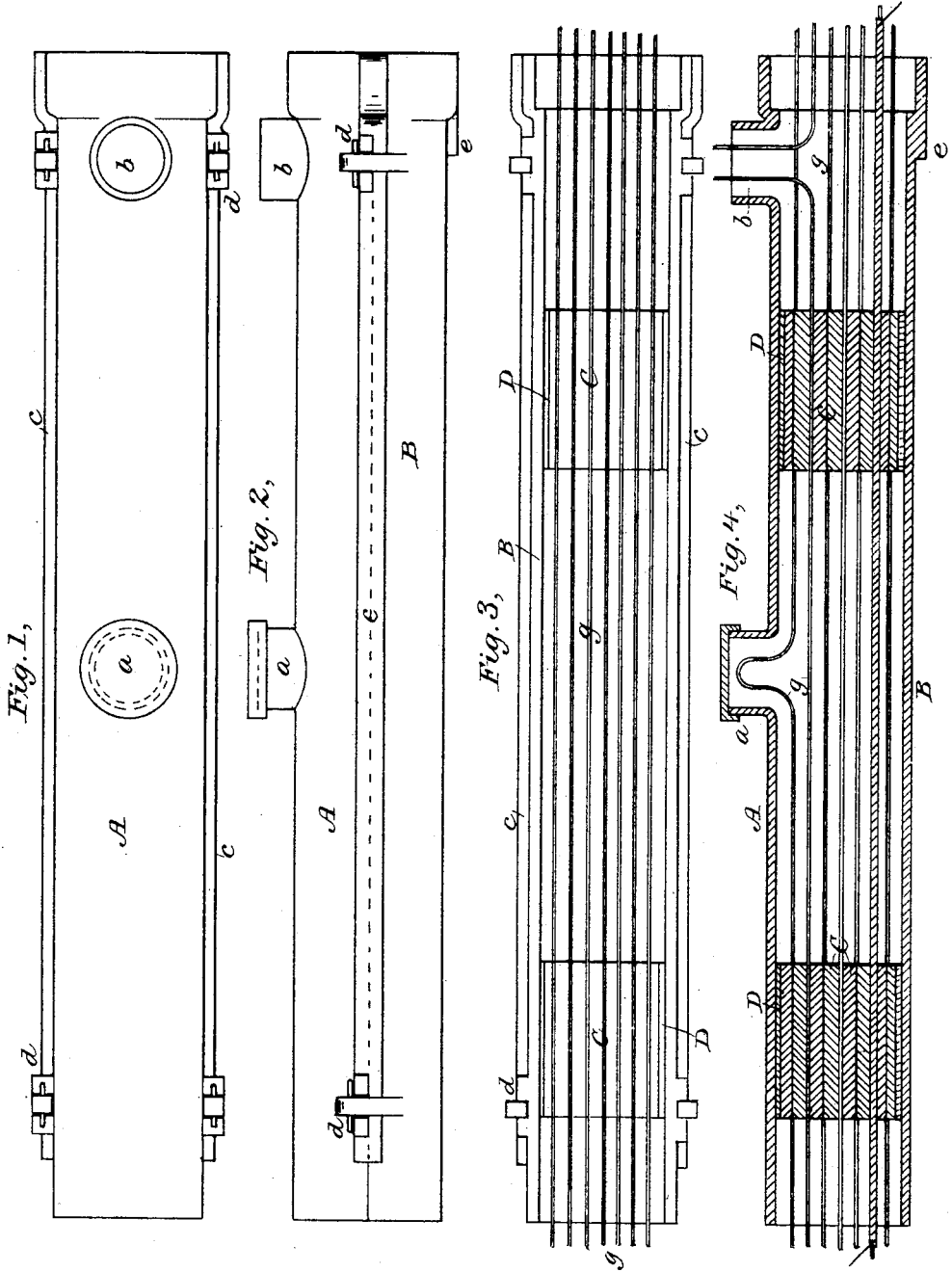
Witnesses:
Wm. A. Skinkle.
Geo. W. Breck.
Inventor:
Henry C. Spalding,
By his Attorney
Marcellus Bailey (No Model.)  3 Sheets—Sheet 2.

H. C. SPALDING.
MEANS FOR PROTECTING ELECTRICAL CONDUCTORS UNDERGROUND.

No. 327,463.  Patented Sept. 29, 1885.

Witnesses:
Wm A. Skinkle.
Geo W. Breck

Inventor:
Henry C. Spalding.
By his Attorney.
Marcellus Bailey

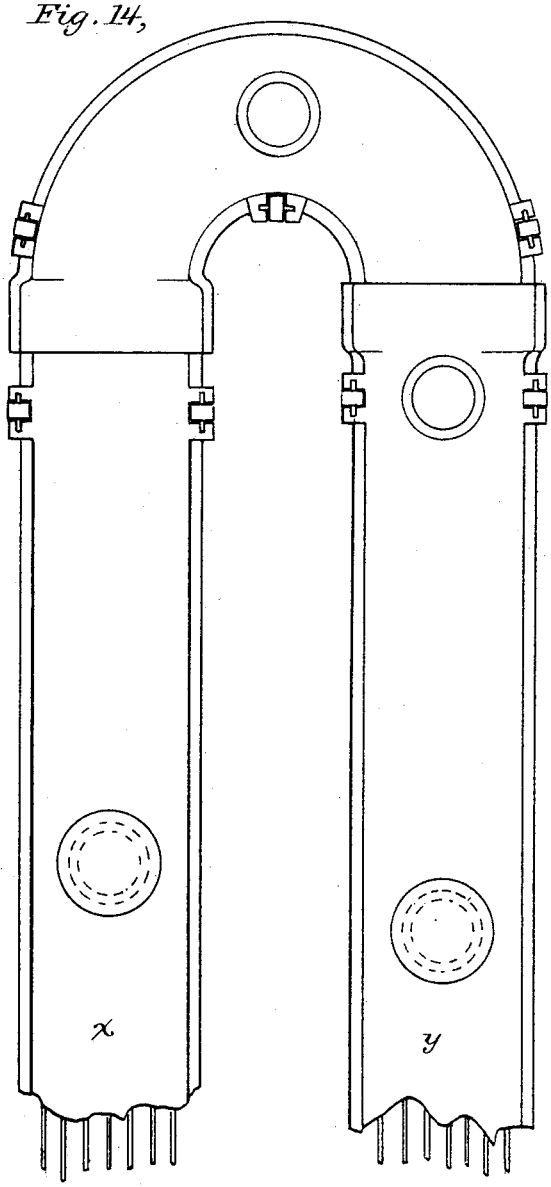

UNITED STATES PATENT OFFICE.

HENRY C. SPALDING, OF BOSTON, MASSACHUSETTS.

MEANS FOR PROTECTING ELECTRICAL CONDUCTORS UNDERGROUND.

SPECIFICATION forming part of Letters Patent No. 327,463, dated September 29, 1885.

Application filed December 7, 1881. Renewed May 21, 1885. (No model.)

*To all whom it may concern:*

Be it known that I, HENRY C. SPALDING, a citizen of the United States, and a resident of Boston, in the county of Suffolk and State of Massachusetts, have invented certain new and useful Improvements in Means for Sheathing and Protecting Electrical Conductors in Subterranean Lines, of which the following is a specification, reference being had to the drawings accompanying and forming a part of the same.

It is my object, mainly, in the present invention to obtain a simple and efficient and readily-applied device for containing and protecting the electrical conductors of subterranean lines.

In carrying out my invention I make use of a sectional pipe, substantially such as hereinafter described, which is combined with grooved wire-holding block-segments made of a non-conducting and fusible material, and adapted, when fitted together, to fill that part of the pipe in which they are placed. After the block-segments are fitted together around the wires, for which they serve as supports, and the sections of pipe secured together, the remaining spaces in the pipe are filled with a hot non-conducting composition which will harden in cooling. The wire-holding blocks being themselves of a fusible nature will partially melt on their exposed faces and fuse with the hot non-conducting filling, thereby forming within the pipe a practically solid or homogeneous core in which the wires being embedded are prevented from displacement and protected from moisture. I also combine with the pipe and the block-segments wrappers interposed between the pipe and the blocks and inclosing the latter, so as to prevent water or other substance that may enter the pipe from leaking through the joints formed by the meeting-faces of the segments. These and other features of my invention can, however, best be explained and understood by reference to the accompanying drawings, in which—

Figure 5:
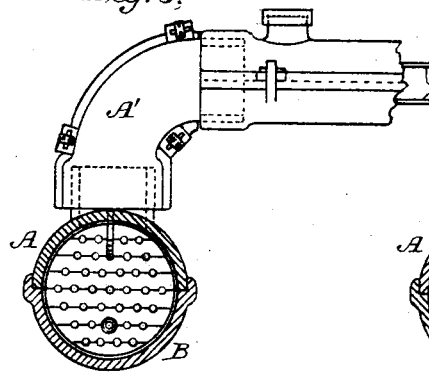
Figure 6:
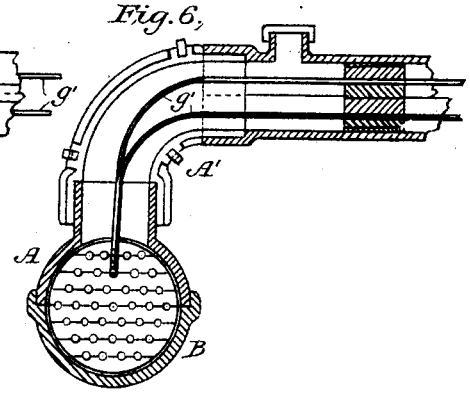
Figure 7:
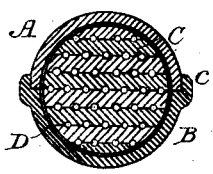
Figure 9:
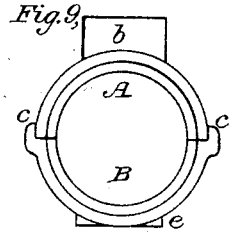
Figure 11:
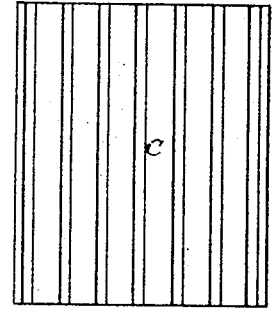
Figure 8:
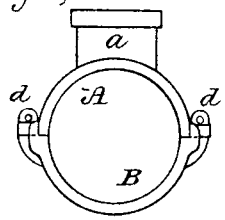
Figure 10:
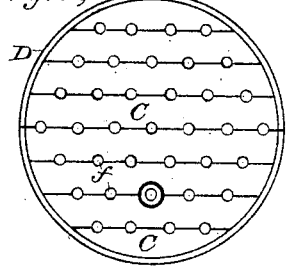
Figure 12:
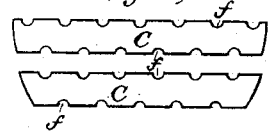
Figure 13:
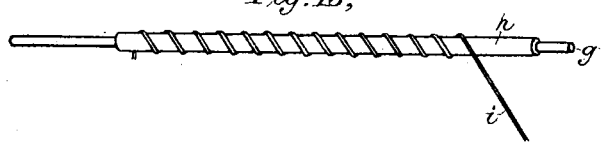

Figure 1 is a plan, and Fig. 2 a side elevation, of one length of a sectional pipe adapted to be used in connection with my improvements. Fig. 3 is a plan of the under pipe-section, B, and its contents with the upper section removed therefrom. Fig. 4 is a vertical central longitudinal section of the pipe having the blocks and wires in place. Fig. 5 represents in side elevation a branch pipe connected to the main which is shown in section. Fig. 6 is a similar view with the branch pipe in section. Fig. 7 is a transverse section of the pipe through one set of wire-holding block-segments. Fig. 8 is an elevation of the "spigot" end of a pipe-section; Fig. 9, an elevation of the "bell" end of the same. Fig. 10 is an enlarged end elevation of a set of wire-holding block-segments. Fig. 11 is a plan on enlarged scale of one of the block-segments. Fig. 12 is an enlarged end view of two adjoining block-segments. Fig. 13 is a section of insulated and protected conductor; and Fig. 14 a plan view of a pipe containing a bend such as would be required in running a pipe for round-wire circuits.

The pipe is divided lengthwise and horizontally into two sections, A B, which are constructed and fitted together substantially in the manner shown and described in Letters Patent No. 215,947, dated May 27, 1879. This is the form of pipe which I prefer; but other forms of sectional pipe may be used, if desired. The upper section is provided with openings $a\ b$, (shown one with the cover on and th other with the cover removed,) through which the filling is poured in, and branch-connections are made. When the sections are put together, the edges of the upper section rest within lips $c$ on the lower section, and the two are held in place by a lug and pin connection, as indicated at $d$. A foot-piece, $e$, is formed on the bottom of the under section at the bell end to keep the pipe from rolling over. The wire-supports, one of which with its wrapper is shown in Fig. 10, are composed each of a number of horizontal superposed segments, C, which are so shaped on their sides that when fitted together they will form a cylindrical core of a diameter to snugly fill the box of the sectional pipe A B. Longitudinal half-circle grooves $f$ are formed in the contiguous faces of the segments, and are so placed with reference to one another that when the segments are placed together the grooves in adjoining faces will meet, and thus form cylindrical holes extending through the block for the reception of the wires $g$. The wires are arranged in tiers after the lowest block-segment is put in place. The wires are stretched over it in grooves f on its top, then the next segment is fitted down over the wires, and so on until all the wires desired have been laid and the cylindrical block or blocks built up, after which the upper pipe-section, A, is put in place and secured. A wrapper, D, is placed in the pipe before the support is built up, so as to be interposed between the blocks and the pipe, with a view of excluding from the joints of the support any substance that may accidentally leak into the pipe. After the pipe is closed it is filled through one of the openings a b with a hot non-conducting composition which will harden in cooling.

Various compositions may be used. That which I prefer to employ is one composed of asphalt and petroleum residuum—say, nine-tenths asphalt and one-tenth petroleum residuum—although these proportions may be varied. Asphalt alone, when cold, becomes brittle, but when mixed with petroleum residuum the resulting composition is tough and very tenacious, and being besides a very perfect insulator, it is admirably adapted for the purpose which I have in view. I mold the segments from the same material, and I also saturate or coat the wrapper with it. When the hot filling is poured into the pipe, it melts the exposed parts of the block-segments and wrapper sufficiently to form with them a connected and continuous mass of homogeneous material, so that when the mass cools there will be inside the pipe a nearly solid core, in which the wires are held insulated from one another.

In order to close the filling-aperture a or b, the cap or cover is first heated and then placed over the opening which is filled up with the composition. The cap heats and melts the composition and finds its own bearing thereon, and when cool is cemented fast in place. Whenever it is desired to remove the cap this can be done by heating it to such an extent as to melt the filling inside. Branch connections are made through the openings a or b, and for this purpose loops or ends of one or more of the conducting-wires can be carried up into these openings, as indicated in Fig. 4. Through the opening b in this figure protrude the ends of one of the conductors in a position to be coupled onto by a branch line for local use at a station along the line. Within the covered opening a is shown a loop, indicating the manner of adjusting a continuous wire so that it may be got at with ease whenever it may be desired to cut the wire at that point for the purpose of connecting its ends to any branch or local station.

The invention thus described in its simplest form is applicable for use under various modifying conditions. In lieu of simple wires or conductors, I may employ compound wires in the manner indicated in Figs. 4, 5, and 10, and of any known kind, Fig. 13 being one example. The wire g is in this case insulated by a coating, h, around which is applied a second conductor, i. The latter may be grounded at two or more points or used as the return-conductor, the object in either case being to reduce induction and interference between different lines. The wires f may be used singly, in connection with the ground, to form independent circuits, or two may be taken together to form round-wire circuits; or, in cases where with the currents used there is a very great difference of potential between different parts of the circuit, the pipes may be used for the whole length of the lines. For this purpose, or where bends are necessary, the construction shown in Fig. 14 is employed, the rounded portion of the pipe-line being sectional and in other respects similar to the straight sections. Where a branch line of one or more wires is needed, the requisite number of wires is taken from the main group and carried through one of the openings a b into a branch pipe. The branch wires are indicated at g'. The branch pipe is of the same construction as the main pipe, and the branch wires are held and insulated therein in the same way as the main wires. The branch elbow A' is composed of sections similar to those of the pipe, but united by a vertical instead of horizontal joint.

The advantages secured by the described mode of laying and insulating wires are numerous.

Heretofore covered or sectional conduits have been filled with grooved blocks or boards, used for holding and insulating wires. When the supports are made and applied in the manner described, however, great saving in expense is effected and the laying of the wires greatly facilitated, as the blocks are easily made and fitted. In adapting the blocks to a circular and sectional conduit the special advantage is gained of bringing a large number of wires into a very small space, and insulating them by the use of a comparatively small quantity of non-conducting compound.

Having now described my invention, what I claim is—

1. The combination of the pipe formed of sections A and B, the non-conducting wire-supports composed of superposed grooved segments placed at intervals in the pipe, the wires or electrical conductors, and the non-conducting filling, all substantially as herein set forth.

2. The combination of the pipe formed of sections A and B and provided with orifices in the section A, the non-conducting wire-supports composed of superposed grooved segments of fusible non-conducting material placed at intervals in the pipe, the wires or conductors, and the filling of fusible insulating material, all substantially as set forth.

3. The combination of the pipe formed of sections A and B, the non-conducting wire-supports composed of superposed grooved segments of insulating material, the wrappers surrounding the supports, the wires or conductors, and the filling of insulating material.

4. The combination of the pipe formed of sections A and B, means for locking the same together, the non-conducting wire-supports composed of superposed segments grooved upon their contiguous faces and placed at intervals in the pipe, the wires or electrical conductors, and the non-conducting filling, all substantially as herein set forth.

5. The combination, with the main pipe composed of the semi-cylindrical sections A and B and means for locking the same together, branch pipes extending from the main pipe, sectional wire-supports placed at intervals in the pipes, and a filling of plastic insulating material, all as set forth.

In testimony whereof I have hereunto set my hand this 29th day of October, 1881.

H. C. SPALDING.

Witnesses:
 HENDERSON J. EDWARDS,
 LYSANDER BURNETT.